United States Patent
Gresham et al.

(10) Patent No.: US 10,044,700 B2
(45) Date of Patent: Aug. 7, 2018

(54) IDENTITY ATTESTATION OF A MINOR VIA A PARENT

(71) Applicant: McAfee, Inc., Santa Clara, CA (US)

(72) Inventors: Timothy J. Gresham, Portland, OR (US); Tobias M. Kohlenberg, Portland, OR (US); Ravi L. Sahita, Beaverton, OR (US); Tracy E. Camp, Beaverton, OR (US); Harvir Singh, Portland, OR (US); Robert L. Vaughn, Portland, OR (US); Ned M. Smith, Beaverton, OR (US); Cedric Cochin, Portland, OR (US)

(73) Assignee: MCAFEE, LLC, Santa Clara, CA (US)

( * ) Notice: Subject to any disclaimer, the term of this patent is extended or adjusted under 35 U.S.C. 154(b) by 96 days.

(21) Appl. No.: 14/580,985

(22) Filed: Dec. 23, 2014

(65) Prior Publication Data

US 2016/0182508 A1    Jun. 23, 2016

(51) Int. Cl.
*H04L 29/06*    (2006.01)

(52) U.S. Cl.
CPC ...... *H04L 63/0807* (2013.01); *H04L 63/0861* (2013.01); *H04L 63/102* (2013.01)

(58) Field of Classification Search
CPC .... H04L 63/0876; H04L 63/101; G06F 17/60
See application file for complete search history.

(56) References Cited

U.S. PATENT DOCUMENTS

| | | | | |
|---|---|---|---|---|
| 8,250,097 B2 * | 8/2012 | Rhodes | ............. | G06F 17/30867 707/783 |
| 8,510,845 B1 * | 8/2013 | Spertus | .................. | G06Q 10/10 705/75 |
| 8,978,130 B2 * | 3/2015 | Handler | ................ | G06F 21/606 726/21 |
| 9,208,337 B2 * | 12/2015 | Tayloe | ................ | G06F 21/6218 |
| 9,547,862 B2 * | 1/2017 | Akin | .................. | G06Q 20/4037 |
| 2003/0163383 A1 * | 8/2003 | Engelhart | ............. | G06Q 20/02 705/75 |
| 2005/0133582 A1 * | 6/2005 | Bajikar | ................... | G06F 21/57 235/10 |
| 2014/0195815 A1 * | 7/2014 | Taveau | ................... | G06F 21/32 713/186 |

* cited by examiner

*Primary Examiner* — Wasika Nipa
(74) *Attorney, Agent, or Firm* — Hanley, Flight and Zimmerman, LLC (57) ABSTRACT

A technique allows a parentally attested security token to serve as authentication for a minor using identifying attributes of the minor child. The security token may include personally identifiable information about the child, a description of authorized activity as well as specifications of intended use of the security token. The security token may include provisions for authentication to be revoked by a parent or guardian and/or expire after a predetermined time. The security token may be stored inside a trusted execution environment of a portable computing device that may be carried by the minor and presented at physical locations where authentication is required.

23 Claims, 7 Drawing Sheets

IDENTITY ATTESTATION OF A MINOR VIA A PARENT

TECHNICAL FIELD

Embodiments described herein generally relate to personal communication devices, and more particularly to techniques for authentication of a minor by using a parentally attested security token in a personal communication device at a merchant location.

BACKGROUND ART

User identification today relies on the ability of the user to provide a proof of identity. Schemes for identification and authentication rely on characteristics and attributes typically associated with an adult. For example, credit cards, phone numbers, state issued driver's license or the like may be used at merchants and other data points used to confirm the identity of the adult, in online transactions, or the like. However, minors (i.e., children under the age of majority) who may need to authenticate themselves when their parents and guardians are not around may not have the same adult type information to identify themselves. Existing solutions to authenticate the identity of a minor to others can include a note from a parent or a guardian, a school issued identification card (ID card) or a state issued ID card. However, these solutions are not effective. A note may be forged to change its credentials and/or forged to authorize the minor to do what may be outside the scope of authorization by the parent or guardian. Also, state or school ID cards are not standardized and in some cases these ID cards may not be provided at all to a minor. A way of authenticating a minor at physical locations when an adult is not present would be desirable.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "malware" can refer to any software used to disrupt operation of a programmable device, gather sensitive information or gain access to private systems or networks. Malware includes computer viruses (including worms, Trojan horses, etc.), Bots, ransomware, spyware, adware, scareware and any other type of malicious programs.

As used herein, the term "cloud services" can refer to services made available to users on demand via the Internet from a cloud computing provider's servers that are fully managed by a cloud services provider.

As used herein, the term "Trusted Execution Environment" (TEE) can refer to a secure area that resides in the main processor of a portable device and ensures that sensitive data is stored, processed and protected in a trusted environment. The TEE may be made up of software and hardware that provides security against malware attacks and assists in the control of access rights and houses sensitive information.

As used herein, the term "Enhanced privacy ID" (or EPID) can refer to a digital signature scheme that includes one group public key that corresponds to multiple private keys. Each unique private key can be used to sign a message and generate an EPID signature. The EPID signature can be verified using the group public key.

A technique allows a parentally attested electronic security token to serve as authentication for a minor using identifying attributes of the minor child. In embodiments, the security token may include personally identifiable information about the child, a description of authorized activity as well as specifications of intended use of the security token. In embodiments, the security token may include provisions for authentication to be revoked by a parent or guardian and/or expire after a predetermined time. The security token may be stored inside a trusted execution environment of a portable computing device that may be carried by the minor and may be used to authenticate the minor to the portable computing device. A parent's credentials may be used to authenticate the minor to a third-party service or service offering services to minors in when the portable computing device is presented at physical location of the third-party service where authentication is required.

Figure 1:
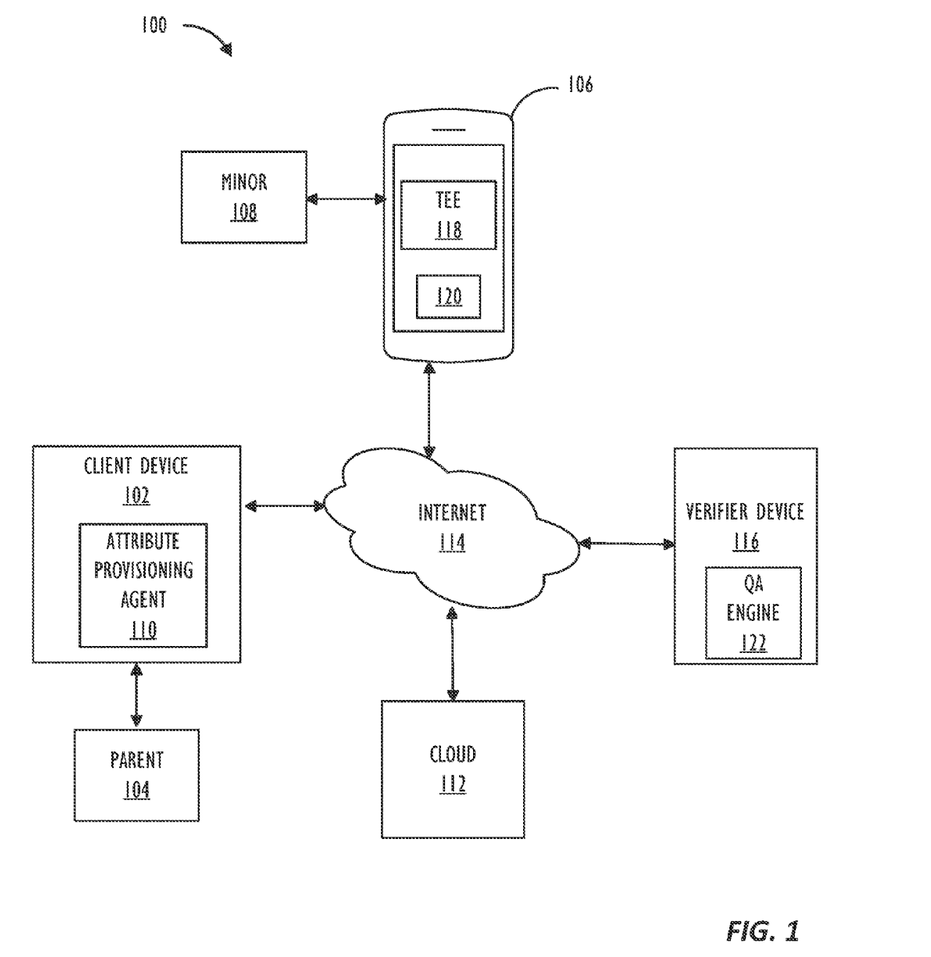
FIG. 1 is a diagram illustrating a system for attestation of the identity of a minor according to one embodiment.

Referring to the figures, FIG. 1 illustrates an example system 100 for authenticating the identity of a minor using parental attested credentials according to one embodiment. System 100 may include a plurality of client devices 102 and 106, verifier device 116 and cloud service 112 that are communicatively coupled via one or more networks, for example, coupled via Internet 114.

In the example of FIG. 1, client devices 102 and 106, may include mobile devices such as, for example, a smart phone, a tablet device, a portable digital assistant, a wearable computing device as well other computers, including a portable computer and a desktop computer. Client device 102 may interact with client device 106 directly through near field communications (NFC), via Bluetooth wireless communication, or the like or indirectly via Internet 114. Client device 102, which may be accessed by parent or guardian 104 may include an attribute provisioning agent 110 that is configured to communicate parent credentials and/or child attributes to cloud service 112 via Internet 114 for generation of a security token that may be used for minor identity attestation with respect to security token. Client device 106 may be configured to receive the security token from client device 102 or cloud service 112. Security token may be stored in trusted execution environment (TEE) 118 such as, for example an Intel® Software Guard Extensions (SGX), Intel® Converged Security Engine (CSE), Intel® Manageability Engine (ME) (INTEL is a registered trademark of Intel Corporation).

Security token may be used by a verifier device associated with a merchant that authenticates minor 108 with respect to one or more transactions or activities minor is authorized to perform with merchant and the duration of the activity that minor 108 is authorized to perform. In an embodiment, TEE 118 of client device 106 may be configured to open a secure attestation session (e.g., via a sigma key exchange protocol) with verifier device of merchant that is signed by an EPID digital signature scheme. TEE 118 attributes are exchanged attesting to the type of trusted execution environment and its security properties.

Parent 104 may be required to register with cloud service 112 in order to request a security token and may be required to provide information related to parent 104's identity and parent 104's relationship to minor 108 in a parent/guardian capacity. In an embodiment, parent 104 may pre-register with cloud service 112 for establishing parent credentials and establishing relationship of parent 104 to minor 108. In embodiments, parent 104 may have more stringent requirements as to information that is required to authenticate the parent 104 and establish parent 104's relationship to minor 108. Information on parent 104 may include parent 104's state issued ID, name, address, birth certificate for minor 108 that confirms relationship to parent 104, social security information for minor 108. Once authenticated, parent 104 may generate information to issue a security token in order to authorize activity of a minor 108 using parent 104's attested credentials.

Security token uses parent attestation credentials for authenticating minor 108 with respect to performing one or more transactions with a merchant associated with verifier device 116. In embodiments, security token is an electronic token that may include information related to attributes of minor 108, duration of the activity that minor is authorized to perform, credentials of parent or guardian associated with minor 108, or the like. In an embodiment, sensors 120 may be configured to authenticate minor 108 to TEE 118 in client device 106. Sensors 120 may include hardware and software sensors including fingerprint scanner, iris scanner, touch integrated keyboard, locally stored biometric templates, password hash of minor 108's password. It is to be appreciated that Internet 114 is not limited to a network of interconnected computer networks that use an internet protocol (IP), and can also include other high-speed data networks and/or telecommunications networks that are configured to pass information back and forth to client devices 102, 106, verifier device 116 and cloud service 112.

Verifier device 116 may be associated with a merchant and may be configured to communicate with client device 106 during authentication of client device 106 associated with minor 108. Verifier device 116 includes a QA Engine 122 (i.e., question and answer engine 122) that may query TEE 118 with questions that may elicit a "yes" or "no" response from TEE 118 during authentication of minor 108. Verifier device 116 may communicate with client device 106 directly including Near-field communications, Wi-Fi®, Bluetooth®, Infrared (IR), etc. protocols or indirectly via Internet 116. (WI-FI is a registered certification mark of Wi-Fi Alliance; BLUETOOTH is a registered certification mark of Bluetooth SIG, Inc.) Verifier device 116 may also be in communication with cloud service 112 in order to receive security token data related to attributes of minor 108 and parent 104's credentials for authenticating client device 106 associated with minor 108 with respect to perform an activity that is authorized by parent 104, duration of activity, description of activity, or the like.

Figure 2:
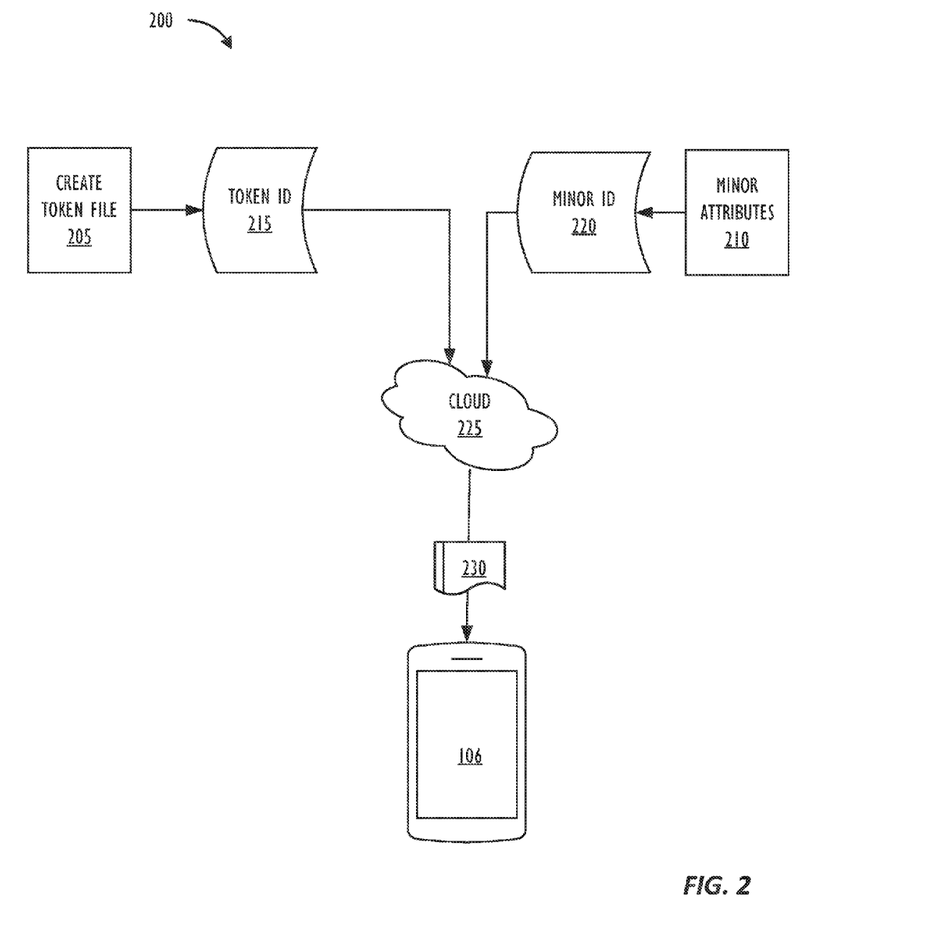
FIG. 2 is a dataflow diagram illustrating a technique for generating a security token for use in a personal device according to one embodiment.

FIG. 2 is a dataflow diagram illustrating a process 200 for generating a security token 230 in a system such as illustrated in FIG. 1, according to one embodiment. While FIG. 2 is being described with reference to parent 104, it is to be appreciated that this description is not intended to be limiting and may also be applied to a guardian or the like. With continued reference to FIG. 1, the technique in FIG. 2 for generating a security token 230 begins with parent 104 using a client device, such as client device 102, to create a token file 205. In an embodiment, token file 205 may include activity information that the parent is authorizing the minor to participate. In embodiments, parent authorized information may include information that relates to the activity that the minor may participate, start date and end date for the activity for which the minor is authorized and a description of the activity for which the minor may be authorized. Token file 205 may also include information related to multiple activities for which the minor is authorized to participate. Token file 205 may be used to store data in a token ID 215. Token ID 215 may store information in any desired format for processing by a cloud service 225. Cloud service 225 is similar to cloud service 112.

Also shown in FIG. 2, parent 104 may also use client device 102 to create a minor attributes file 210 with identification (ID) information about minor 108. Minor attributes file 210 may include any desired protected identification information about minor 108. Minor 108's information may include attributes that parent 104 has deemed appropriate for sharing with a merchant associated with verifier device 116 and need not include any specific information about the minor 108's identity, for example, need not include social security information, date of birth, address, biometric information or the like. In embodiments, attributes of minor 108 may include minor 108's height, weight, electronic photograph or image, hair color or the like. In one embodiment, parent 104 may provide answers to questions that minor 108 may be expected to know. These questions and answers may be used to query cloud service 112 when a physical security token is not available for minor 108 to use in authentication of minor 108 by a verifier device 116. Minor attributes file 210 may store attributes data in a minor ID 220. Minor ID 220 may store information in any desired format for processing by a cloud service 225. Cloud service 225 may be cloud service 112 of FIG. 1.

Token ID 215 and minor ID 220 are communicated to cloud service 225. Cloud service 225 processes the information that is received and may issue a security token 230. Security token 230 may be provided to parent 104 of client device 102 for provisioning security token 230 into TEE 118 of client device 106. In another embodiment, parent 104 may use client device 106 to communicate with cloud service 225 and receive the issued security token 230 for provisioning security token 230 directly into TEE 118 of client device 106. Security token 230 includes information that may be used to authenticate the identity of minor 108, authorized activity for minor 108 and dates for the activity that minor 108 is authorized. In another embodiment, security token 230 includes information that may be used by a third-party merchant for validating the identity of minor 108 through a question and answer query that minor 108 is expected to know based on information provided by parent 104 during security token creation, which may also confirm that issuer of security token 230 is trusted to be a parent or guardian of minor 108.

Figure 3:
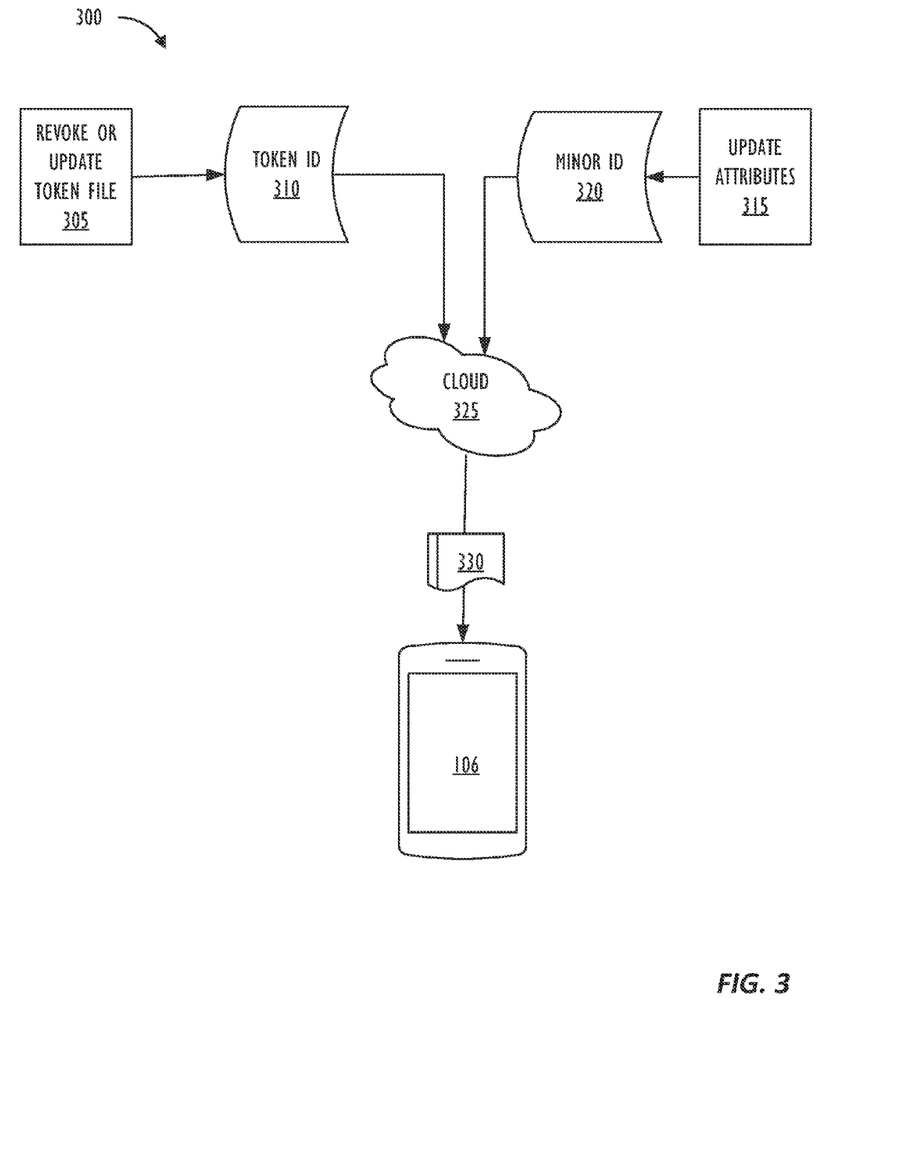
FIG. 3 is a dataflow illustrating a technique for updating the security token of FIG. 2 according to one embodiment.

FIG. 3 is a dataflow diagram illustrating a process 300 for updating a previously generated security token 230 of FIG. 2 in a system such as illustrated in FIG. 1, according to one embodiment. Parent 104 may use client device 102 or client device 106 to revoke a previously issued security token or update information to a security token. In an embodiment, parent 104 may use client device 102 to update token file 305. In an embodiment, parent 104 may update token file 305 with updated information that changes the activity information, date, or the like. In another embodiment, parent 104 may update token file 305 with updated information that cancels authorization for minor participation in the previously authorized activity or cancels the date. Token file 305 may store updated information in an updated token ID 310. In another embodiment, parent 104 may use client device 102 to update attributes of minor 108. For example, if minor 108 changes hair color, grows in height, increases or reduces weight, or the like, parent 104 may update minor 108's attributes file 315 with updated information. Minor ID 320 may store updated minor 108's attributes.

Token ID 310 and/or minor ID 320 are communicated to cloud service 325 for evaluation. Cloud service 325 may be cloud service 112 of FIG. 1. Cloud service 325 may act on the updated token ID 310 and/or minor ID to create an update security token data 330. Updated security token data 330 may include changes to activity, changes to dates, changes to minor attributes or revocation of previously issued security token 230 (FIG. 2). Updated security token data 330 may be sent to parent 104 via client devices 102, 108 for provisioning of the updated security token data 330 into TEE 118 of client device 106.

Figure 4:
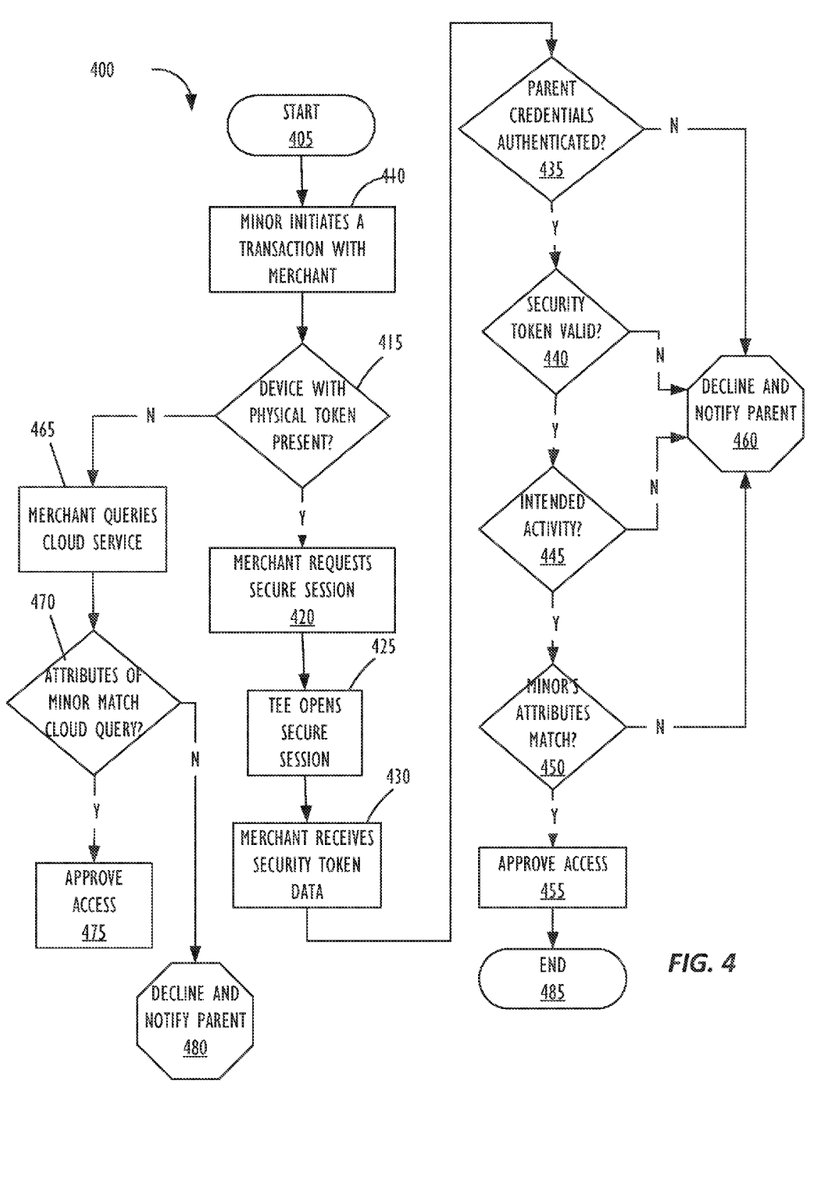
FIG. 4 is a flowchart illustrating a technique for identity attestation of a minor according to one embodiment.

FIG. 4 is a flow chart illustrating a technique or process 400 for minor identity authentication via parent attestation according to an embodiment. With continued reference to FIG. 1, process begins in step 405.

In 410, minor 108 may initiate a transaction with a merchant at a physical merchant location. In an embodiment, minor may be initiating a transaction to perform a particular activity based on parental consent or non-parental consent.

In 415, if client device 106 is carried by minor 108 that contains a physical security token (i.e., step 415="Y"), then, in 420, a verifier device of a merchant, e.g., verifier device 116, requests a secure attestation session with client device 106. However, if minor 108's device does not have a physical security token or minor does not have a portable device (i.e., step 415="N"), then, step 415 proceeds to step 465 where verifier device 116 may query cloud service 112 with question and answer questions for which answers were provided by parent 104 during issuance of security token. In step 470, verifier device 116 queries cloud service 112 with question and answer challenge questions (i.e., search query language queries) as a means of looking up minor 108 based on observed biometric data visible (i.e., weight, height, hair color, eye color) or other information provided by minor 108 with respect to minor 108's parents and activity minor 108 wants to participate (e.g., "my name is John Smith. My father Jack Smith said I can ride the water slide"). If attribute look-up matches minor 108's physical attributes (i.e., step 470="Y"), then, in step 475, minor is granted access to activity. However, if attributes do not match minor 108's attributes (i.e., step 470="N"), then, in 480 access for minor 108 to perform the activity is denied and parent 104 may be notified that minor 108 was denied access In 425, TEE 118 of client device 106 may respond and open a secure attestation session with verifier device 116. In an embodiment, TEE 118 of client device 106 opens a secure attestation session (e.g., via a sigma key exchange protocol) where Diffie-Hellman session keys are created and signed by an EPID digital signature scheme. TEE 118 attributes are exchanged attesting to the type of trusted execution environment and its security properties.

In 430, verifier device 116 receives a copy of the security token from cloud service 112. The copy of the security token may be substantially similar to the security token stored in TEE 118 and may include minor 108's attributes, authorized activities for minor 108, or the like.

In 435, verifier device 116 authenticates parent credentials from copy of security token data that is received from cloud service 112 with parent's credentials from the security token in TEE 118 using key protocol (e.g., sigma). In an embodiment, parent 104's credentials is attested using sigma key exchange protocol whereby parent 104's credentials are protected for privacy (whereby EPID signs parent 104's credentials). Parent credentials from TEE 118 are compared against parent credentials from cloud service 112 to determine if they match, which indicates authenticity of parent credentials. In an embodiment, parent credentials from TEE 118 may be used to authenticate client device 106 via security token stored in TEE 118 to verifier device 116.

If parent's credentials are authenticated (i.e., step 435="Y"), then, step 435 proceeds to step 440 where security token in TEE 118 is evaluated against the copy of the security token to determine if security token is valid and/or security token is not revoked. However, if parent credentials are not authenticated (i.e., step 435="N"), then step 435 proceeds to step 460 where access for minor to perform the activity is declined and parent 104 is notified that minor 108 was denied access. In an embodiment, verifier device 116 may notify cloud service 112 that minor 108's access was denied and parent 104 may be notified via cloud service 112.

In 440, if security token is valid and/or security token is not revoked (i.e., step 440="Y"), then, step 440 proceeds to step 445 where security token in TEE 118 is evaluated against the copy of the security token to determine if minor 108 is attempting to perform an activity that minor 108 is authorized in security token. In an embodiment, verifier device 116 queries TEE 118 using QA engine whether minor 108 satisfies certain criteria without revealing minor 108's identifiable attributes. For example, verifier device 116 may query TEE 118 with questions that may elicit a "yes" or "no" response such as, for example, "Minor is authorized to attend PG-13 movie?" TEE 118 may evaluate query and respond with a "yes" or "no" and hash of query as nonce. In response, verifier device 116 may verify that parent credential signature using parent's public credentials (e.g., certificate, Kerberos ticket, OpenID token, or the like). However, if security token is not valid and/or is revoked (i.e., step 440="N"), then step 440 proceeds to step 460 where access for minor 108 to perform the activity is declined and parent 104 is notified that minor 108 was denied access. In an embodiment, verifier device may notify cloud service 112 that minor 108's access was denied and parent 104 may be notified via cloud service 112.

In 445, if minor is performing activity as intended in the security token (i.e., step 445="Y"), then, step 445 proceeds to step 450 where security token in TEE 118 is evaluated against the copy of the security token to determine if minor 108's physical attributes matches attributes of security token. In embodiments, verifier device 116 may query TEE 118 of client device with "yes" or "no" questions relating to minor 108's attributes. TEE 118 may respond with a "yes" or "no" answer and hash of the verifier device 116's query that is signed by the public key of the parent credential. However, if minor 108 is not using token for attached description (i.e., step 445="N"), then step 445 proceeds to step 460 where access for minor to perform the activity is declined and parent 104 is notified that minor 108 was denied access. In an embodiment, verifier device 116 may notify cloud service 112 that minor 108's access was denied and parent 104 may be notified via cloud service 112.

In 450, if minor 108's physical attributes match attributes described in security token (i.e., step 450="Y"), then in 455, access is approved for minor to perform the activity and during the duration that is specified in token. However, if minor 108's physical attributes do not match attributes described in security token (i.e., step 450="N"), then step 450 proceeds to step 460 where access for minor to perform the activity is declined and parent 104 is notified that minor 108 was denied access. In an embodiment, verifier device 116 may notify cloud service 112 that minor 108's access was denied and parent 104 may be notified via cloud service 112. Process 400 ends in step 485.

Benefits of the embodiments described above include allowing parentally attested electronic security token to serve as authentication for a minor using identifying attributes of the minor child without using uniquely identifiable information, which protects safety and privacy of minors. The security token is also revocable and may be constrained to particular times and dates as specified by the parent.

Figure 5:
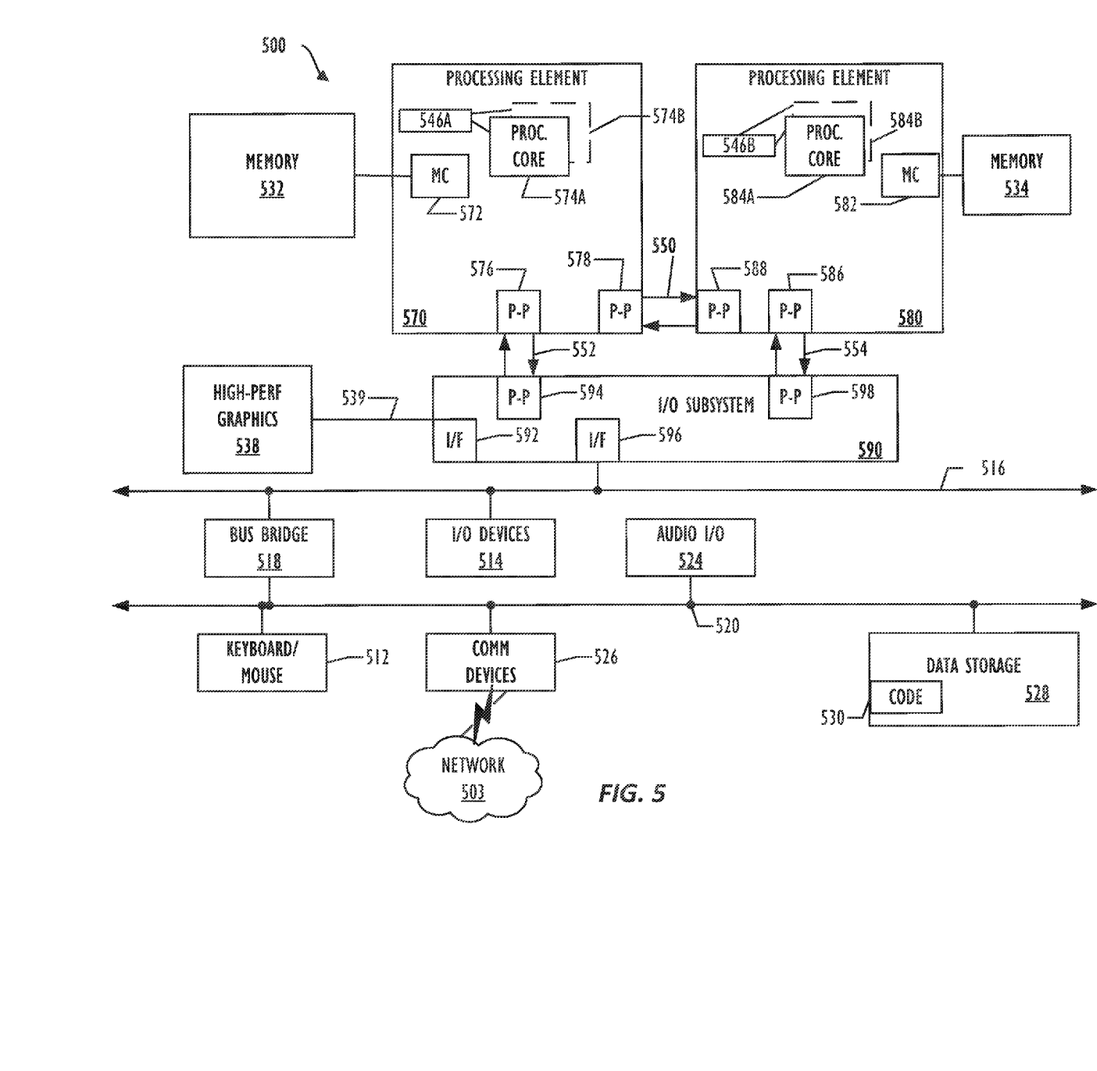
FIG. 5 is a diagram illustrating a computing device for use with techniques described herein according to one embodiment.

Referring now to FIG. 5, a block diagram illustrates a programmable device 500 that may be used within cloud service 112, user client 102 or client 106 in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code in a manner similar to that discussed above in connection with FIGS. 1-4. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 which may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. Also, the elements of FIG. 5 may alternatively be partitioned using more or fewer integrated chips than illustrated in FIG. 5.

Figure 6:
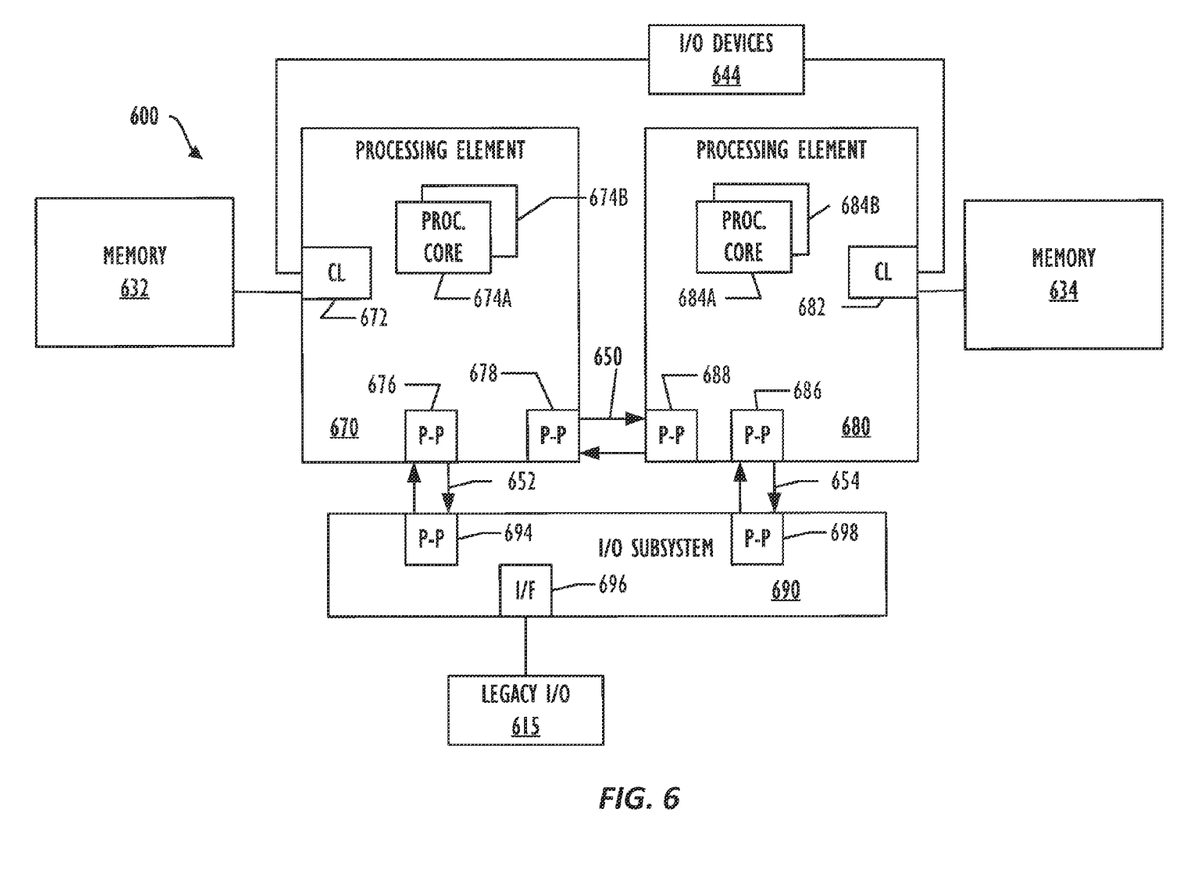
FIG. 6 is a block diagram illustrating a computing device for use with techniques described herein according to another embodiment.

Referring now to FIG. 6, a block diagram illustrates a programmable device 600 according to another embodiment. Certain aspects of FIG. 6 have been omitted from FIG. 5 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 5 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

Figure 7:
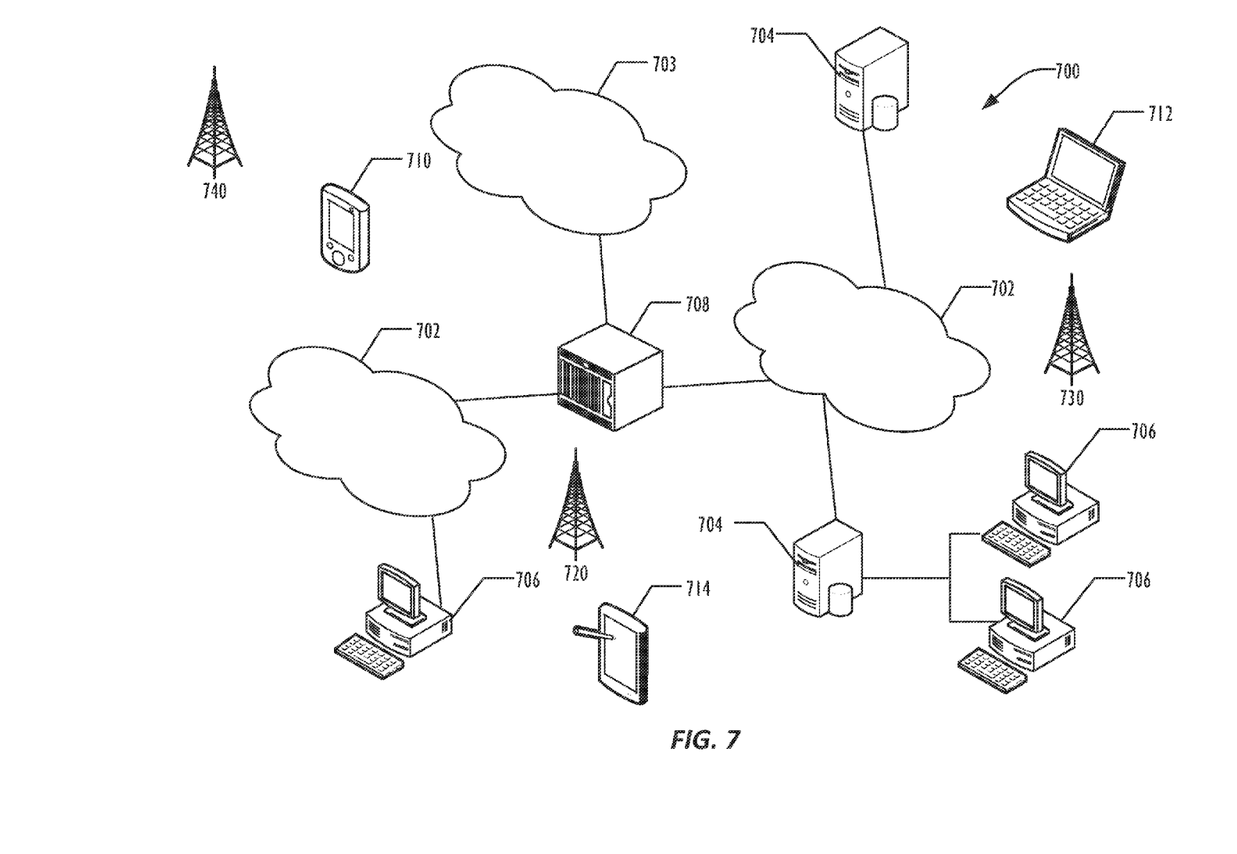
FIG. 7 is a diagram illustrating a network of programmable devices according to one embodiment.

Referring now to FIG. 7, an example infrastructure 700 in which the techniques described above may be implemented is illustrated schematically. Infrastructure 700 contains computer networks 702. Computer networks 702 may include many different types of computer networks available today, such as the Internet, a corporate network or a Local Area Network (LAN). Each of these networks can contain wired or wireless programmable devices and operate using any number of network protocols (e.g., TCP/IP). Networks 702 may be connected to gateways and routers (represented by 708), end user computers 706, and computer servers 704. Infrastructure 700 also includes cellular network 703 for use with mobile communication devices. Mobile cellular networks support mobile phones and many other types of mobile devices. Mobile devices in the infrastructure 700 are illustrated as mobile phones 710, laptops 712 and tablets 714. A mobile device such as mobile phone 710 may interact with one or more mobile provider networks as the mobile device moves, typically interacting with a plurality of mobile network towers 720, 730, and 740 for connecting to the cellular network 703. Although referred to as a cellular network in FIG. 7, a mobile device may interact with towers of more than one provider network, as well as with multiple non-cellular devices such as wireless access points and routers 708. In addition, the mobile devices 710, 712 and 714 may interact with non-mobile devices such as computers 704 and 706 for desired services, which may include providing authentication of a minor using identifying attributes of the minor and authenticating a parent to a service using parent credentials as described above. The functionality of the client devices 102 or client 106 may be implemented in any device or combination of devices illustrated in FIG. 7; however, most commonly is implemented in a firewall or intrusion protection system in a gateway or router.

The following examples pertain to further embodiments.

Example 1 is a computer system for authentication of a minor, comprising: one or more processors; and a memory coupled to the one or more processors, on which are stored instructions, comprising instructions that when executed cause one or more of the processors to: receive information regarding initiation of a transaction with a client device associated with the minor; query the client device to determine authentication information for the minor, wherein the authentication information is associated with a security token; receive a copy of the security token with a copy of the authentication information; and compare the security token with the copy of the security token; wherein the authentication information includes at least one of physical attributes of the minor, authorized activity for the minor, and duration of the authorized activity for the minor.

In Example 2, the subject matter of Example 1 can optionally include, wherein the instructions further comprise instructions that when executed cause the one or more processors to query the client device to determine parent credentials associated with the client device.

In Example 3, the subject matter of Example 2 can optionally include, wherein the instruction further comprise instructions that when executed cause the one or more processors to determine if the parent credentials are authenticated to the client device.

In Example 4, the subject matter of Examples 1 to 2 can optionally include, wherein the instructions further comprise instructions that when executed cause the one or more processors to determine if the minor is authorized to perform the transaction responsive to the comparing of the security token with the copy of the security token.

In Example 5, the subject matter of Examples 1 to 2 can optionally include, wherein the instructions further comprise instructions that when executed cause the one or more processors to determine if the minor is authorized to perform the transaction further comprise instructions that when executed cause the machine to determine at least one of: whether the physical attributes in the security token matches a copy of the physical attributes in the copy of the security token; and whether the authorized activity in the security token matches a copy of the authorized activity in the copy of the security token.

In Example 6, the subject matter of Example 5 can optionally include, wherein the instructions further comprise instruction that when executed cause the one or more processors to deny access of the minor to the transaction responsive to a determination that the physical attributes does not match the copy of the physical attributes.

In Example 7, the subject matter of Examples 5 can optionally include, wherein the instructions further comprise instruction that when executed cause the one or more processors to deny access of the minor to the transaction responsive to a determination that the authorized activity does not match the copy of the authorized activity.

In Example 8, the subject matter of Examples 1 to 2 can optionally include, wherein the instructions further comprise instructions that when executed cause the one or more processors receive a copy of the security token from a cloud service.

In Example 9, the subject matter of Examples 1 to 2 can optionally include, wherein the instructions further comprise instructions that when executed cause the one or more processors to query the client device to authenticate parent credentials for a parent of the minor.

Example 10 is a method for authenticating a minor, comprising: receiving information regarding initiation of a transaction with a client device associated with the minor; querying the client device to determine authentication information for the minor, wherein the authentication information is associated with a security token; receiving a copy of the security token with a copy of the authentication information; and comparing the security token with the copy of the security token; wherein the authentication information includes at least one of physical attributes of the minor, authorized activity for the minor, and duration of the authorized activity for the minor.

In Example 11, the subject matter of Example 10 can optionally include querying the client device to determine parent credentials associated with the client device.

In Example 12, the subject matter of Example 11 can optionally include determining if the parent credentials are authenticated to the client device.

In Example 13, the subject matter of Examples 10 to 11 can optionally include determining if the minor is authorized to perform the transaction responsive to the comparing of the security token with the copy of the security token.

In Example 14, the subject matter of Examples 10 to 11 can optionally include determining if the minor is authorized to perform the transaction further comprise instructions that when executed cause the machine to determine at least one of: whether the physical attributes in the security token matches a copy of the physical attributes in the copy of the security token; and whether the authorized activity in the security token matches a copy of the authorized activity in the copy of the security token.

In Example 15, the subject matter of Example 14 can optionally include denying access of the minor to the transaction responsive to a determination that the physical attributes does not match the copy of the physical attributes.

In Example 16, the subject matter of Example 14 can optionally include denying access of the minor to the transaction responsive to a determination that the authorized activity does not match the copy of the authorized activity.

In Example 17, the subject matter of Examples 10 to 11 can optionally include receiving a copy of the security token from a cloud service.

In Example 18, the subject matter of Examples 10 to 11 can optionally include querying the client device to authenticate parent credentials for a parent of the minor.

Example 19 is a computer system for authentication of a minor, comprising: one or more processors; and a memory coupled to the one or more processors, on which are stored instructions, comprising instructions that when executed cause one or more of the processors to: provide information regarding a relationship of parent to the minor; provide activity information regarding activity that is authorized for the minor; provide attribute information regarding attributes of the minor; and receive a security token comprising the activity information and the attribute information.

In Example 20, the subject matter of Example 19 can optionally include, wherein the instruction further comprise instruction that when executed cause the one or more processors to receive revocation instructions regarding revoking the security token.

In Example 21, the subject matter of Example 19 can optionally include, wherein the instruction further comprise instruction that when executed cause the one or more processors to receive at least one of updated activity information regarding the activity for the minor or updated attribute information regarding the attributes of the minor.

Example 22 is a method for authentication of a minor, comprising: providing information regarding a relationship of parent to the minor; providing activity information regarding activity that is authorized for the minor; providing attribute information regarding attributes of the minor; and receiving a security token comprising the activity information and the attribute information.

In Example 23, the subject matter of Example 22 can optionally include receiving revocation instructions regarding revoking the security token.

In Example 24, the subject matter of Examples 22 to 23 can optionally include receiving at least one of updated activity information regarding the activity for the minor or updated attribute information regarding the attributes of the minor.

In Example 25, the subject matter of Example 24 can optionally include updating information regarding the security token responsive to receiving at least one of the updated activity information or the updated attribute information.

Example 26 is a machine readable medium, on which are stored instructions, comprising instructions that when executed cause a machine to: receive information regarding initiation of a transaction with a client device associated with a minor; query the client device to determine authentication information for the minor, wherein the authentication information is associated with a security token; receive a copy of the security token with a copy of the authentication information; and compare the security token with the copy of the security token; wherein the authentication information includes at least one of physical attributes of the minor, authorized activity for the minor, and duration of the authorized activity for the minor.

In Example 27, the subject matter of Example 26 can optionally include, wherein the instructions further comprise instructions that when executed cause the machine to determine if the minor is authorized to perform the transaction responsive to the comparing of the security token with the copy of the security token.

In Example 28, the subject matter of Example 26 can optionally include, wherein the instructions further comprise instructions that when executed cause the machine to determine if the minor is authorized to perform the transaction further comprise instructions that when executed cause the machine to determine if the physical attributes in the security token matches a copy of the physical attributes in the copy of the security token.

In Example 29, the subject matter of Example 28 can optionally include, wherein the instructions further comprise instruction that when executed cause the machine to deny access of the minor to the transaction responsive to a determination that the physical attributes does not match the copy of the physical attributes.

In Example 30, the subject matter of Examples 26 to 28 can optionally include, wherein the instructions when executed cause the machine to determine if the minor is authorized to perform the transaction further comprise instructions that when executed cause the machine to determine if the authorized activity in the security token matches a copy of the authorized activity in the copy of the security token.

In Example 31, the subject matter of Example 30 can optionally include, wherein the instructions further comprise instruction that when executed cause the machine to deny access of the minor to the transaction responsive to a determination that the authorized activity does not match the copy of the authorized activity.

In Example 32, the subject matter of Examples 26 to 28 can optionally include, wherein the instructions that when executed cause the machine to receive a copy of the security token further comprise instructions that when executed cause the machine receive a copy of the security token from a cloud service.

In Example 33, the subject matter of Examples 26 to 28 can optionally include, wherein the instructions further comprise instructions that when executed cause the machine to query the client device to authenticate parent credentials for a parent of the minor.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed cause a machine to:
   receive information regarding initiation of a secure attestation session for a transaction with a client device associated with a minor, wherein the information includes one or more session keys that are signed with one or more digital signatures;
   receive, from the client device, parent credentials indicative of an issuer of minor authentication information stored on the client device;
   receive, from a remote device, a copy of the parent credentials indicative of a trusted guardian of the minor, wherein the remote device is part of a cloud service;
   evaluate authenticity of the parent credentials with the copy of the parent credentials to determine authenticity of the issuer of the minor authentication information;
   transmit one or more queries for the minor authentication information to the client device relating to the minor based on a determination that the parent credentials are authentic;
   receive, from the client device, one or more query responses indicative of the minor authentication information, wherein the query responses are hashed and signed with one or more parent credential signatures generated from the parent credentials, wherein the one or more parent credential signatures include one or more public keys of the parent credentials;
   authenticate the client device to perform the transaction based on the query responses and verification of the parent credential signatures; and
   generate a notification to send to a device associated with the issuer based on a determination that the client device is denied access to perform the transaction,
   wherein the minor authentication information includes information indicative of one or more physical attributes of the minor, information indicative of one or more authorized activities for the minor, information indicative of a duration of the one or more authorized activities for the minor, or combinations thereof.

2. The non-transitory machine readable medium of claim 1, wherein the instructions to authenticate the client device comprise instructions that when executed cause the machine to:
   verify the parent credential signatures with public credentials of the copy of the parent credentials; and
   evaluate the query responses to determine whether the minor is authorized to perform the one or more authorized activities, wherein the query responses include answers to questions within the queries.

3. The non-transitory machine readable medium of claim 2, wherein the instructions further comprise instructions that when executed cause the machine to deny access to the client device for the transaction based on the answers included in the query responses.

4. The non-transitory machine readable medium of claim 1, wherein the instructions to authenticate the client device comprise instructions that when executed cause the machine to
   evaluate the query responses to determine whether one or more physical attributes indicated by the queries match one or more physical attributes of the minor, wherein the query responses include answers to questions within the queries.

5. The non-transitory machine readable medium of claim 4, wherein the instructions further comprise instruction that when executed cause the machine to deny access to the client device for the transaction in response to a determination that the one or more physical attributes indicated by the queries do not match the one or more physical attributes of the minor.

6. The non-transitory machine readable medium of claim 1, wherein the instructions to receive from the client device the parent credentials comprise instructions that when executed cause the machine to obtain the parent credentials and the query responses from a trusted execution environment of the client device.

7. The non-transitory machine readable medium of claim 1, wherein the instructions to receive from the client device the parent credentials comprises instructions that when executed cause the machine to obtain the parent credentials from a trusted execution environment of the client device by performing a key exchange protocol.

8. The non-transitory machine readable medium of claim 1, wherein the queries include questions that relate to determining whether the transaction is one of the authorized activities without revealing minor identifiable information.

9. A computer system for authentication of a minor, comprising:
   one or more processors; and
   a memory coupled to the one or more processors, on which are stored instructions, comprising instructions that when executed cause the one or more of the processors to:
   receive information regarding initiation of a secure attestation session for a transaction with a client device associated with the minor, wherein the information includes one or more session keys that are signed with one or more digital signatures;

receive, from the client device, parent credentials indicative of an issuer of minor authentication information stored on the client device;

receive, from a remote device, a copy of the parent credentials indicative of a trusted guardian of the minor, wherein the remote device is part of a cloud service;

evaluate authenticity of the parent credentials with the copy of the parent credentials to determine authenticity of the issuer of the minor authentication information;

transmit one or more queries for the minor authentication information to the client device relating to the minor based on a determination that the parent credentials are authentic;

receive, from the client device, one or more query responses indicative of the minor authentication information, wherein the query responses are hashed and encoded with one or more parent credential signatures generated from the parent credentials, wherein the one or more parent credential signatures include one or more public keys of the parent credentials;

authenticate the client device to perform the transaction based on the query responses and verification of the parent credential signatures; and generate a notification to send to a device associated with the issuer based on a determination that the client device is not authenticated to perform the transaction, wherein the minor authentication information includes information indicative of one or more physical attributes of the minor, information indicative of one or more authorized activities for the minor, information indicative of a duration of the one or more authorized activities for the minor, or combinations thereof.

10. The computer system of claim 9, wherein the instructions to authenticate the client device comprise instructions that when executed cause the one or more processors to:

verify the parent credential signatures with public credentials of the copy of the parent credentials; and evaluate the query responses to determine whether the minor is authorized to perform the one or more authorized activities, wherein the query responses include answers to questions within the queries.

11. The computer system of claim 10, wherein the instructions further comprise instruction that when executed cause the one or more processors to deny access to the client device for the transaction based on the answers included in the query responses.

12. The computer system of claim 9, wherein the instructions to authenticate the client device comprise instructions that when executed cause the one or more processors to evaluate the query responses to determine whether one or more physical attributes indicated by the queries match one or more physical attributes of the minor, wherein the query responses include answers to questions within the queries.

13. The computer system of claim 12, wherein the instructions further comprise instruction that when executed cause the one or more processors to deny access to the client device for the transaction in response to a determination that the one or more physical attributes indicated by the queries do not match the one or more physical attributes of the minor.

14. The computer system of claim 9, wherein the instructions to receive from the client device comprise instructions that when executed cause the one or more processors to obtain the parent credentials and the query responses from a trusted execution environment of the client device.

15. The computer system of claim 9, wherein the instructions to receive from the client device the parent credentials comprise instructions that when executed cause the one or more processors to obtain the parent credentials from a trusted execution environment of the client device by performing a key exchange protocol.

16. The computer system of claim 9, wherein the queries include questions that relate to determining minor activity information without revealing minor identifiable information.

17. A method for authenticating a minor, comprising:

receiving information regarding initiation of a secure attestation session for a transaction with a client device associated with the minor, wherein the information includes one or more session keys that are signed with one or more digital signatures;

receiving, at a verifier device and from the client device, parent credentials indicative of an issuer of minor authentication information stored on the client device;

receiving, from a remote device and at the verifier device, a copy of the parent credentials indicative of a trusted guardian of the minor, wherein the remote device is part of a cloud service;

evaluating, at the verifier device, authenticity of the parent credentials with the copy of the parent credentials to determine authenticity of the issuer of the minor authentication information;

transmitting, at the verifier device, one or more queries for the minor authentication information to the client device related to the minor based on a determination that the parent credentials are authentic;

receiving, at the verifier device and from the client device, one or more query responses indicative of the minor authentication information, wherein the query responses are hashed and signed with one or more parent credential signatures generated from the parent credentials, wherein the one or more parent credential signatures include one or more public keys of the parent credentials;

authenticating, at the verifier device, the client device to perform the transaction based on query response and verification of the parent credential signatures; and generating, at the verifier device, a notification to send to a device associated with the issuer based on a determination that the client device is denied access to perform the transaction, wherein the minor authentication information includes information indicative of one or more physical attributes of the minor, information indicative of one or more authorized activities for the minor, information indicative of a duration of the one or more authorized activities for the minor, or combinations thereof.

18. The method of claim 17, wherein receiving from the client device the parent credentials comprises obtaining the parent credentials and the query responses from a trusted execution environment of the client device.

19. The method of claim 17, wherein the queries include questions that relate to determining minor activity information without revealing minor identifiable information.

20. A computer system for authentication of a minor, comprising:

one or more processors; and a memory coupled to the one or more processors, on which are stored instructions, comprising instructions that when executed cause the one or more of the processors to:

receive, at a client device associated with a minor, parent credentials from a remote device associated with an issuer of minor activity information and minor attribute information, wherein the remote device is part of a cloud service;

receive, at the client device, the minor activity information regarding activity that is authorized for the minor from the remote device associated with the issuer;

receive, at the client device, minor attribute information regarding attributes of the minor from the remote device associated with the issuer;

initiate a secure attestation session with a verifier device that includes exchanging one or more session keys that are signed with one or more digital signatures with the verifier device;

transmit, at the client device, the parent credentials to the verifier device, wherein the parent credentials are indicative of an issuer of the minor activity information and the minor attribute information;

receive, at the client device, one or more queries from the verifier device for the minor activity information, the minor attribute information, or both after authenticating the issuer is a trusted guardian of the minor; and transmit, to the verifier device, one or more query responses indicative of the minor activity information, the minor attribute information, or both, wherein the query responses are hashed and encoded with one or more parent credential signatures generated from the parent credentials, wherein the one or more parent credential signatures includes one or more public keys of the parent credentials, and wherein the query responses are configured to be evaluated to determine whether the client device is denied access to perform an activity.

21. The computer system of claim 20, wherein the instructions further comprise instructions that when executed cause the one or more processors to receive at least one of updated minor activity information regarding the activity for the minor or updated minor attribute information regarding the attributes of the minor.

22. The computer system of claim 21, wherein the queries include questions that relate to determining minor activity information, minor attribute information, or both without revealing minor identifiable information, and wherein the query responses include answers to the questions.

23. The computer system of claim 20, wherein the client device receives the parent credentials, the minor activity information, and the minor attribute information from the remote device after registering a relationship between the minor and the issuer.

* * * * *